(12) United States Patent
Pomrink

(10) Patent No.: US 7,589,133 B2
(45) Date of Patent: Sep. 15, 2009

(54) STABILIZERS FOR POLYMERIZABLE BIOCOMPATIBLE MATERIALS

(75) Inventor: Gregory J. Pomrink, Lansdale, PA (US)

(73) Assignee: Orthovita, INc., Malvern, PA (US)

( * ) Notice: Subject to any disclaimer, the term of this patent is extended or adjusted under 35 U.S.C. 154(b) by 0 days.

(21) Appl. No.: 11/734,453

(22) Filed: Apr. 12, 2007

(65) Prior Publication Data

US 2007/0196908 A1    Aug. 23, 2007

Related U.S. Application Data

(62) Division of application No. 10/135,309, filed on Apr. 30, 2002, now abandoned.

(51) Int. Cl.
*A61L 24/06* (2006.01)
*A61L 24/04* (2006.01)
*A61K 6/08* (2006.01)
*A61K 6/083* (2006.01)

(52) U.S. Cl. .............. 523/115; 523/105; 523/113; 523/116

(58) Field of Classification Search ............ 523/105, 523/109, 112, 113, 114, 115, 116, 117, 118
See application file for complete search history.

(56) References Cited

U.S. PATENT DOCUMENTS

| | | | | |
|---|---|---|---|---|
| 4,665,217 | A | 5/1987 | Reiners et al. | 560/160 |
| 4,797,282 | A * | 1/1989 | Wahlig et al. | 424/422 |
| 4,837,115 | A | 6/1989 | Igarashi et al. | 428/36.92 |
| 5,290,289 | A | 3/1994 | Sanders et al. | 606/61 |
| 5,681,872 | A | 10/1997 | Erbe | 523/114 |
| 5,941,037 | A | 8/1999 | Hallock et al. | 52/407 |
| 5,981,548 | A | 11/1999 | Paolini et al. | 514/316 |
| 6,010,714 | A * | 1/2000 | Leung et al. | 424/448 |
| 6,136,294 | A | 10/2000 | Adjei et al. | 424/45 |
| 6,136,885 | A | 10/2000 | Rusin et al. | 523/116 |
| 6,160,033 | A * | 12/2000 | Nies | 523/116 |
| 6,162,419 | A | 12/2000 | Perricone et al. | 424/59 |
| 6,168,655 | B1 | 1/2001 | Nohr et al. | 106/31.58 |
| 6,458,162 | B1 | 10/2002 | Koblish et al. | 623/23.51 |
| 6,982,288 | B2 * | 1/2006 | Mitra et al. | 523/120 |
| 2005/0165136 | A1 * | 7/2005 | Mays et al. | 524/3 |

\* cited by examiner

*Primary Examiner*—Michael J Feely
(74) *Attorney, Agent, or Firm*—Woodcock Washburn LLP; Gina M. Nagvajara

(57) ABSTRACT

The present invention provides polymerizable biocompatible materials stabilized by amino acids or reducing salts to improve shelf life. Methods of stabilizing a polymerizable biocompatible material that inhibit auto polymerization of the material over time are also provided.

21 Claims, 2 Drawing Sheets

STABILIZERS FOR POLYMERIZABLE BIOCOMPATIBLE MATERIALS

CROSS-REFERENCE TO RELATED APPLICATIONS

This application is a divisional of U.S. application Ser. No. 10/135,309, filed Apr. 30, 2002 now abandoned.

FIELD OF THE INVENTION

The present invention relates to stabilizers for polymerizable biocompatible materials and polymerizable biocompatible materials with stabilizing amounts of amino acids or reducing salts. Also provided are methods of stabilizing such materials.

BACKGROUND OF THE INVENTION

The need for biomaterials in orthopedic and dental applications has increased as the world population ages. A significant amount of research into biomaterials for orthopedic and dental uses has attempted to address the functional criteria for orthopedic and dental reconstruction within the human body. Biomaterials useful for orthopedic and dental reconstructions must have high strength, must be able to be immediately affixed to the situs for reconstruction, must bond strongly to bone, and must give rise to strong, highly resilient restorations.

Among the materials used for orthopedic and dental restorative purposes are bone cements based upon acrylic species such as polymethyl methacrylate (PMMA), bisphenol-A-diglycidyl methacrylate (bis-GMA), triethyleneglycol dimethacrylate (TEGDMA), diurethane dimethacrylate (DUDMA), bisphenol-A-ethoxy methacrylate (bis-MMA), and related compositions. Such materials usually are capable of convenient delivery to the site of restoration and can be formed so as to be moldable and to have reasonable degrees of affinity for bony tissue. Typically, these materials are provided in two package systems consisting of paste/paste or liquid/powder materials to be mixed at the time of use to yield a hardened composite. These systems are commonly initiated under room temperature conditions using a peroxide and a reducing agent, or the like. Photosensitive systems, generally supplying quinines and the like as photoinitiators are also known.

In general, however, the materials that are added to the composition to initiate polymerization under room temperature conditions, such as peroxides, photoinitiators, other free radical generators (azo compounds, persulfates, phosphines, etc.), and certain reducing agents (amines, ascorbates, metal salts, etc.) can prematurely initiate polymerization. Decomposition can result if the materials are stored too long or exposed to heat and/or light. Photochemical and thermal degradation of peroxides have both shown to yield radicals that prematurely initiate polymerization in (meth)acrylate based systems. This phenomena is typically controlled by atmospheric oxygen and/or through the addition of UV stabilizers and free radical scavengers such as butylhydroxytoluene (BHT), hydroquinone (HQ), methyl ether hydroquinone (MEHQ), etc. However, oxidation of the accelerating agents decreases the efficiency of the system and ultimately can result in the failure of the system to polymerize upon mixing. Unfortunately, the addition of most commercial antioxidants will further inhibit polymerization.

U.S. Pat. No. 5,941,037 to Hallock, et al. disclose a modified anionic hydrotalcite particulate used as an oxygen scavenger in the packaging of food products. The particulate containing oxygen scavenging composition absorbs oxygen from the interior of a container without adversely affecting color, taste, or smell of the packaged product. Hallock does not teach the use of these amino acids alone or without the aid of hydrotalcite to stabilize polymerizable materials.

U.S. Pat. No. 4,837,115 to Igarashi, et al. disclose a thermoplastic polyester vessel with a flavor retaining property for use in food packing. The polyester reduces the concentration of acetaldehyde contained in a gas barrier thermoplastic polyester. It also improves the flavor from the gas barrier thermoplastic polyester. The acetaldehyde concentration in a heat-formed vessel wall is reduced when there is a polyamide having a specific terminal amino group. Yet, Igarashi, et al. only teaches the use of the polyester composition to a container and not the contents therein.

U.S. Pat. No. 6,162,419 to Perricone, et al. disclose stabilized compositions of ascorbic acid, ascorbic acid salts, ascorbyl fatty acid ester or their salts for dermatological use. Ascorbic containing acid compositions deteriorate by combining with oxygen in the atmosphere to yield inactive forms. The patent discloses no teaching that cysteine is useful to prevent polymerization.

U.S. Pat. No. 6,136,294 to Adjei, et al. disclose an aerosol formation containing a particulate drug, a propellant, and a stabilizing agent selected from an amino acid, amino acid derivation, or a mixture thereof. Amino acids are used to stabilize the aerosol formulation so that it does not cream, settle, or flocculate after agitation or delivery of the drug. The amino acids are not used to prolong shelf life or prevent polymerization.

U.S. Pat. No. 6,168,655 to Nohr, et al. disclose stabilizers for ink compositions containing a colorant. According to this patent, cysteine can be used as a reducing agent when added to a substrate such as paper, glass, or wood. However, it is not used to stabilize and prolong the shelf life of a polymerizable system.

Accordingly, there is a need to provide a method of stabilizing orthopedic materials to inhibit or minimize the degradation of specific components to improve shelf life and prevent autopolymerization during storage without the introduction of a toxic moiety or a species which inhibits polymerization upon mixing.

There is a further need to provide a stabilizer that reduces the degradation of the constituents of orthopedic materials while maintaining properties such as set-time, degree of functional group conversion, and mechanical properties that tend to change upon aging.

SUMMARY OF THE INVENTION

Applicants have discovered methods employing materials that are useful in, for example, the stabilization of polymerizable biocompatible materials. One embodiment includes polymerizable biocompatible materials comprising a stabilizing amount of amino acid. The amino acid of the present invention may preferably be one or both of the enantiomeric pairs of cysteine, cystine, arginine, and proline. In some preferred embodiments the amino acid is L-cysteine. In other embodiments, a stabilizing amount of reducing salts can be used to stabilize polymerizable materials. Such reducing salts include, but are not limited to, sodium thiosulfate, iron sulfate, and sodium hypophosphite. A stabilizing amount of the amino acid or reducing salt can be from about 0.1% to about 10% by weight of the polymerizable material. In other embodiments, especially where the polymerizable material is a paste, the stabilizing amount can be from about 1% to about 10% by weight. In other embodiments, especially where the polymerizable material is a resin, the stabilizing amount can be from about 0.3% to about 5% by weight. The polymerizable material can comprise at least one ethylenically unsaturated monomer. In some embodiments the material comprises at least one monomer having an acrylic functional group.

In some embodiments, stabilizers, such as an amino acids or reducing salts, are added to polymerizable orthopedic compositions in order to improve their shelf life. It is believed that the stabilizer acts as an oxygen scavenger, reducing the degradation of amines and accelerators without affecting constituents of the composition that allow for proper polymerization of the composition. The stabilizers of the present invention also help prevent further degradation of aged material and inhibit auto polymerization of the material over time while maintaining properties such as degree and rate of functional group conversion upon curing.

A typical embodiment further comprises a filler comprised of particles ranging from about 0.01 μm to about 2-3 mm. The particles can also range from about 0.01 μm to about 100 μm. The filler used herein can be bioactive. In other embodiments, the polymerizable biocompatible material may preferably employ polymerization inhibitors such as hydroquinone and various functional equivalents such as butylatedhydroxytoluene, butylated hydroxyaniline, UV-9 (2-hydroxy-4-methoxy benzophenone), methyl ether hydroquinone, 4-benzyloxy phenol, and 3,5-diisopropyl phenol. Butylatedhydroxytoluene alone can be employed.

The present invention also provides methods of stabilizing a polymerizable biocompatible material. At least one monomer having an acrylate functional group is provided. A stabilizing amount of an amino acid to the monomer to form a stabilizing mix is added, and then a filler is added to the mix to form a stabilized paste. In some methods described herein, the monomer may preferably be bisphenol-A-diglycidyl methacrylate, triethyleneglycol dimethacrylate, diurethane dimethacrylate, bisphenol-A-ethoxy methacrylate, methylmethacrylate, or methacrylate. In others, the monomer can be an ethylenically unsaturated monomer. The methods can employ a stabilizing amount of materials such as one or more of cysteine, cystine, arginine, proline, sodium thiosulfate, iron sulfate, or sodium hypophosphite. In some embodiments that may be preferred, the amino acid cysteine is used. The stabilizing amount of these materials can range from about 0.1% to about 10% by weight of the polymerizable biocompatible material. The amount can also range from about 0.3% to about 5% or from about 0.3% to about 1% by weight of the polymerizable biocompatible material.

The present invention also provides stabilizers for orthopedic compositions that are non-toxic and may enhance the biocompatibility of these materials. Amino acids are naturally occurring in the body. Their presence may influence the growth of bone when near or adjacent to an orthopedic composition.

DETAILED DESCRIPTION OF ILLUSTRATIVE EMBODIMENTS

Figure 1:
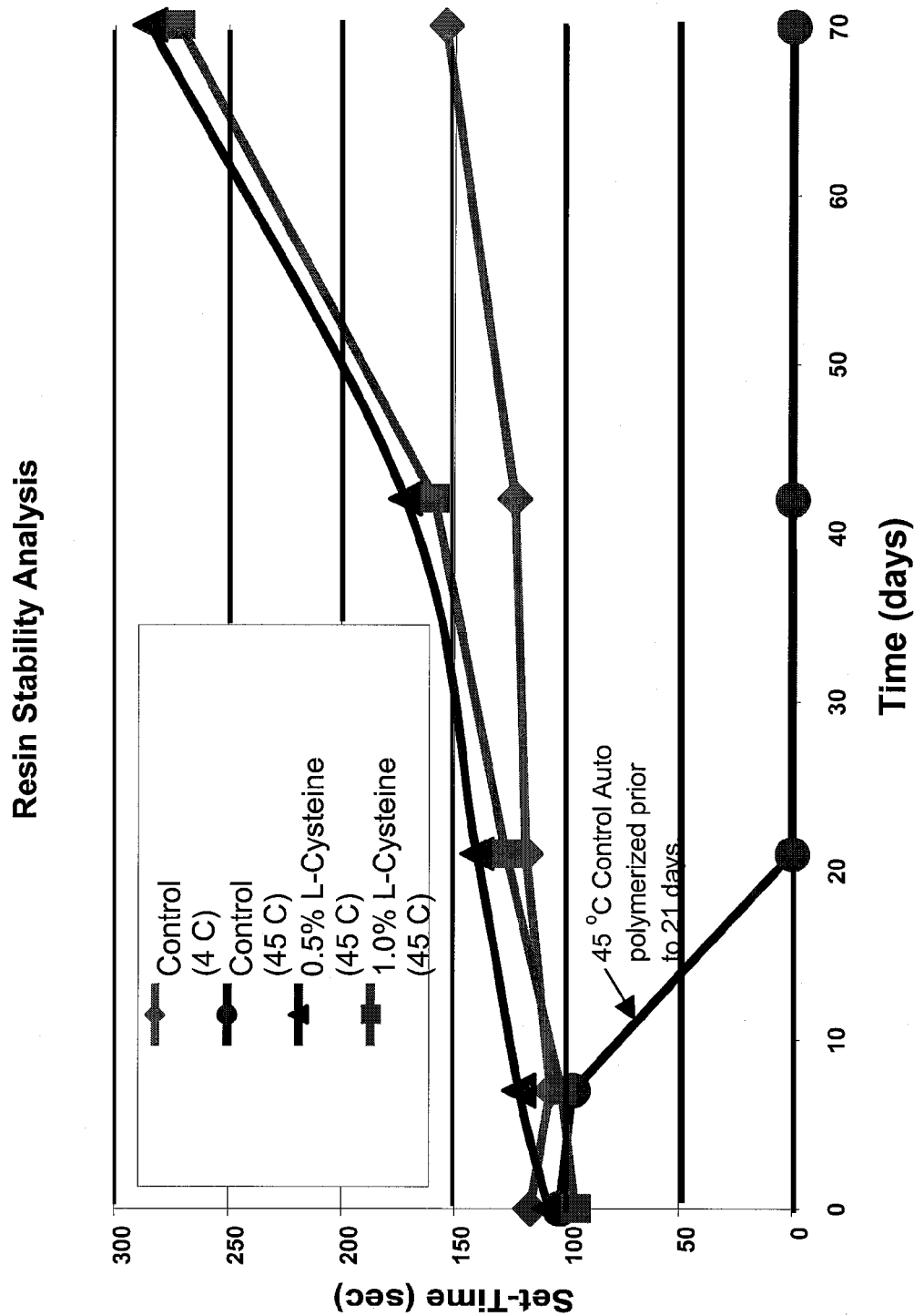
FIG. 1 provides a graphical representation of the effects of the addition of L-cysteine to an amine containing resin of a peroxide/amine initiated methacrylate resin system.

Amino acids suitable as stabilizers for use in accordance with the present invention include, for example, cysteine, cystine, arginine, or proline. Embodiments may employ D or L-cysteine, D or L-cystine, D or L-arginine, D or L-proline or mixtures thereof. Either enantiomer of an amino acid can be used in the present invention. Non-naturally occurring amino acids having similar functionality to the foregoing may also be employed. In some embodiments, L-cysteine is used as the stabilizer. The stabilizers may be added to the monomer or resin blend, added to the paste, or may be provided as a coating on the filler as described herein.

In accordance with another embodiment, a stabilizing amount of reducing salts, such as sodium thiosulfate, iron sulfate, or sodium hypophosphite can also be used as a stabilizer. Amino acids and reducing salts suitable for use in the present invention are stabilizing materials. Amino acids, as used herein, are known in the art as an organic compound containing an amino group ($NH_2$), a carboxylic acid group (COOH), and any of various side groups, especially any of the 20 compounds that have the basic formula $NH_2CHRCOOH$, and that link together by peptide bonds to form proteins or that function as chemical messengers and as intermediates in metabolism. A reducing salt, as used herein, is a salt effecting the reduction of a substance or capable of supplying electrons to another substance. While applicant does not wish to be bound by any particular theory, it is believed that a stabilizer added to the polymerizable biocompatible material acts as an oxygen scavenger to prevent oxidation of the polymerization activators. Stability is therefore increased due to the inhibition of autopolymerization during storage without affecting the rate and degree of conversion of the polymerizing system upon mixing. When the stabilizers are added to the system, the set time does not decrease as readily as systems without the stabilizer.

A stabilizing amount of the stabilizer is added to the polymerizable materials of the present invention in amounts sufficient to add stability to the materials but not hinder biocompatibility. In some embodiments where the polymerizable material is a paste, the stabilizing amount can range from about 0.1% about 5% by weight. Some embodiments can have about 0.3% by weight. In other embodiments where the polymerizable material is a resin, the stabilizing amount can range from about 1% about 10% by weight.

Materials of the present invention are capable of bearing significant loads while remaining highly biocompatible with natural bone tissue. The compositions of the present invention are amenable to orthopedic and dental uses in a number of contexts. These systems are suitable for, but not limited to, orthopedic or dental applications such as viscous, restorative bone cement compositions.

The polymerizable biocompatible materials of the present invention can be a polymerizable monomer or monomers that can contain (meth)acrylate functionality. The material to be stabilized can be liquid/powder or paste/paste systems that comprise at least one polymerizable monomer. For the systems of the present invention, stabilizing amount of amino acid can be added to the polymerizable monomer resin or paste prior to packaging and storage.

The polymerizable material can be one or more viscous paste compositions, referred to herein as "pastes," that are blended upon delivery to form one or more homogeneous blends that hardens upon polymerization. Each viscous paste is comprised of at least one polymerizable monomer. The paste can also comprise at least one filler. The paste may be packaged within a delivery vessel that contains one or more cartridges to house the paste. In multiple paste systems, the pastes are dispensed from their respective cartridges and blended together within the delivery vessel to form at least one viscous, homogeneous blend immediately prior to or upon dispensing. The stabilizing amount can be added to and mixed with the monomers, or, alternatively, be provided as a coating on the fillers.

The polymerizable biocompatible material may be preferably ethylenically unsaturated monomers or comprise a (meth)acrylate functionality. Examples of such monomers in one such composition include, but are not limited to, bisphenol-A-diglycidyl methacrylate (bis-GMA), triethyleneglycol demethacrylate (TEGDMA), diurethane dimethacrylate (DUDMA), bisphenol-A-ethoxy methacrylate (bis-MMA), methylmethacrylate (MMA), and methacrylate. Further additions to the paste may include, but are not limited to, polymerization activators, polymerization initiators, radio pacifiers, reinforcing components (i.e., fibers, particles, micro spheres, flakes, etc.), neutralizing resins, diluting resins, antibiotic agents, coloring agents, coupling agents, or radiographic contrast agents. Examples of such additives include, but are not limited to, butylated hydroxytoluene (BHT), N,N-dimethyl-p-toluidine (DMEPT), TEGDMA, dihydroxyethyl-p-toluidine (DHEPT), UV-9 (2-hydroxy-4-methoxy benzophenone), and benzoyl peroxide (BPO).

The polymerizable biocompatible materials that are viscous pastes can further comprise one or more fillers. These fillers can possess a variety of morphologies such as, but not limited to, needles, particulate, flakes, cylinders, long fibers, whiskers, or spherical particles. In some embodiments that may be preferred, the filler is comprised of particles with an average particle size ranging from about less than 1.0 µm up to about 2-3 millimeters (mm). Preferably, the average particle size distribution ranges from about 0.01 µm to about 100 µm.

The filler may be comprised of an inorganic or organic material, which may be bioactive. In certain embodiments, the filler is comprised of an inorganic material. The filler added to the paste enhances the mechanical or the rheological properties of the paste composition. Examples of suitable fillers include, but are not limited to, barium glass, barium-boroaluminosilicate glass, sodium borosilicate, silica, 45S5 glass, bioactive glass, ceramics, glass-ceramics, bioactive synthetic combeite glass-ceramic, e-glass, s-glass, iron phosphate, or combinations thereof. The filler or fillers are generally pre-dried prior to blending with other fillers. One or more fillers can be coated with silane prior to sterilization.

The stabilizers can be added to a monomer or resin blend or can be provided as a coating on a filler in a variety of ways. The stabilizers can be added to the resin as a solid or a suspension. The resin can then be mixed with fillers, fibers, and the like to form a paste composition. Alternatively, the stabilizers could be added to the filler as a solid, either before or after treatment of the filler via silanation. The filler can then be mixed with the resin to form a paste composition. Further, the stabilizers can be dissolved in the monomer prior to preparation of the composition. Further still, the stabilizers can be dissolved in an alkali solution and then be coated onto the fillers either before or after treatment of the filler. Other methods of adding the stabilizers are also envisioned including aerosolizing the stabilizer and adding it to the resin, monomer, filler, or paste or adding the stabilizer to the silane prior to silanation of the fillers.

Relatively low viscosity, syringable pastes are suited for the filling of bony defects, fracture repair, and implant fixation and revision. Syringable pastes flow to fill voids, and crevices, and adhere tightly to the surface of the bone, tissue, or implant. Rheology can be important for tight adherence and removal of micromotion when implant securing is being achieved. The lack of implant motion can reduce inflammation and determine the success of the implant system over time. Higher viscosity pastes are desirable for larger, load bearing bone defects and easily accessible fracture sites. A putty can be manipulated, sculpted and cured in place with immediate high strength capability. Oncological bony defects are well suited for highly loaded, highly bioactive composites. The use of hand mixed pastes can also facilitate the addition of medicaments, antibiotics, or bone growth factors.

The polymerizable monomer or monomers that comprise the viscous, paste compositions can be ethylenically unsaturated monomers and can comprise an acrylate functional group. The term "monomers", as used herein, can also represent dimers, trimers, resins, resin components, or any other polymerizable component. Examples of the monomers include, but are not limited to, bisphenop-A-diglycidyl methacrylate (bis-GMA, triethyleneglycol dimethacrylate (TEGDMA), bisphenol-A-ethoxy methacrylate (bis-EMA), and MMA. The monomers within the paste composition can be activated prior to sterilization. The monomers can be activated by the addition of BPO, azo compounds, persulfates, photoinitiators (i.e. camphorquinone) or other free radical formers and tertiary amines, or other reducing agents, such as DHEPT, ethyl-4-N,N-dimethylaminobenzoate (EDMAB), DMEPT, ascorbates, etc., that can provide an electron withdrawing group that initiates free radical polymerization.

Methacrylate, ethyl methacrylate, propyl methacrylate, higher methacrylates, acrylates, ethacrylates, and similar species can also be employed as all or part of the polymerizable biocompatible materials of the present invention. It is also possible to employ other types of polymerizable material such as styrenes, cycanoacrylates, epoxide compounds, polyurethane-precursor species, and a wide host of other materials. For example, other monomers useful in the production of hardenable compositions of this invention include methyl-, ethyl, isopropyl-, tert-butyloctyl-, dodecyl-, cyclohexyl-, chloromethyl-, tetrachloroethyl-, perfluorooctyl-, hydroxyethyl-, hydroxypropyl-, hydroxybutyl-, 3-hydroxyphenyl-, 4-hydroxphenyl-, aminoethyl-, aminophenyl-, and thiophenyl-, acrylate, methacrylate, ethacrylate, propacrylate, butacrylate and chloromethacrylate, as well as the homologous mono-acrylic acid esters of bisphenol-A, dihydroxydiphenyl sulfone, dihydroxydiphenyl ether, dihydroxybiphenyl, dihydroxydiphenyl sulfoxide, and 2,2 bis(4-hydroxy-2,3,5,6-tetrafluorophenyl)propane. Polymerizable monomers capable of sustaining a polymerization reaction such as the di-, tri-, and higher acrylic ethylene glycol dimethacrylate, diethylene glycol dimethacrylate, trimethylene glycol dimethacrylate; trimethylol propane trimethacrylate, analogous acrylates, and similar species are also useful. It is also possible to employ more than two mixtures of polymerizable species to good effect.

The polymerizable bioactive materials of the present invention can further comprise, but are not limited to, polymerization inhibitors, polymerization activators, polymerization initiators, radiopacifiers, reinforcing components (i.e., fibers, particles, micro spheres, flakes, etc.), fillers, including bioactive fillers, neutralizing resins, diluting resins, antibiotic agents, coloring agents, plasticizers, coupling agents, free radical generators, radiographic contrast agents, and antibiotics.

It may be preferable that polymerization inhibitors can be added to the composition to minimize polymerization during storage. Examples of polymerization inhibitors include hydroquinone, and various functional equivalents such as butylated hydroxytoluene (BHT), butylated hydroxyaniline (BHA), UV-9 (2-hydroxy-4-methoxy benzophenone), methyl ether hydroquinone (MEHQ), 4-benzyloxy phenol, and 3,5-diisopropyl phenol.

Polymerization activators are typically amines and are used to promote free radical generation from organic peroxide initiators in addition to polymerizations. The free radicals are generated at temperatures around room temperature or below by chemical reduction of the peroxide or under light of varying wavelength in the case of photoinitiated systems. Examples of such activators are DMEPT, DHEPT, and functional equivalents such as N,N-deimethyl-meta-toluidine, N,N-dimethyl-ortho-toluidine, and N-ethyl-N-hydroxyethyl-meta-toluidine.

Color agents may be added to the composition to impart color and may include dyes, paint pigments, or reduced metal particles.

Plasticizers may be added to the composition to facilitate processing and increase the flexibility of the final product. Examples of plasticizers include TEGDMA, hydroxyethyl methacrylate (HEMA), and phthalates such as diethyl phthalate, benzylbutyl phthalate, dibutyl phthalate, and dibenzyl phthalate.

Coupling agents are used to link the filler within the composition to the polymer matrix. Typical coupling agents include silanes such as γ-methyacryloxypropyltrimethoxysilane or other coupling agents.

Free radical generators are substances within the composition that decompose to form free radicals that begin the process of polymerization in addition reactions. Examples of free radical generators include benzoyl peroxide, tert-butyl peroxide, dicumyl peroxide, hydrogen peroxide, diethyl peroxide, and hydroperoxides.

Radiographic or diagnostic contrast agents may be added to the composition to enable the composition to be discerned upon X-ray or other diagnostic means. Examples of such agents include barium boroaluminosilicate glasses and glass-ceramics, barium sulfate ($BaSO_4$), zirconium dioxide ($ZrO_2$), chromium oxide (CrO), Ta, Gd or other heavy metal particulate, or bismuthic compounds such as $Bi_2O_3$ and $Bi(OH)_3$.

The polymerizable bioactive materials can comprise two pastes designated as pastes A and B. In certain embodiments, paste A may have to about 25% by weight bis-GMA, up to about 18% by weight TEGDMA, up to about 25% by weight DUDMA, up to about 2% by weight DHEPT, up to about 0.009% by weight butylhydroxytoluene (BHT). In certain embodiments, paste B comprises up to about 15% by weight bis-GMA, from about 4% to about 15% by weight TEGDMA, up to about 25% by weight DUDMA, up to about 0.07% by weight BHT, and up to about 0.70% by weight of BPO. Further, from about 0.1% to about 10% by weight stabilizer can be added to the paste A. All weight percentages provided are the weight percentage ranges of each material within the paste.

The materials described herein are preferably suitable as viscous, restorative bone cement compositions. In such applications, surgeons generally have a limited amount of time to work with the paste prior to its polymerization. Set-time—defined as the amount of time it takes the material to harden after it is blended—is one of the parameters that is monitored for these materials by manufacturers. Various combinations of the amine:BPO:BHT additives within the paste will yield specific working and set times. Within the composition variables given above, the 2.25:1:0.12 ratio gives the preferred long work time of 5 minutes and the slow set time of 8 to 10 minutes. The more preferred 3 minutes working time and 5 to 8 minutes set time is obtained with a 2.6:1:0.15 amine:BPO:BHT ratio. (Each set character will depend on the mass of material used, energy imparted upon mixing, and the temperature of the body at the implant site.) However, the affect of these materials over time is limited due to reactions with atmospheric oxygen or other oxidizing species and thus either set-time is altered or the material autopolymerizes.

The filler or fillers may be pre-dried and screened prior to dry-heat sterilization as needed. In preferred embodiments, one or more fillers are coated with silane that acts as a coupling agent prior to sterilization.

In one embodiment, paste A comprises a silane-coated, 45S5 glass filler that is combined in a blending step with a treated/coated silica to form filler A. An example of a coated, glass-ceramic filler has from about 44% to about 46% by weight $SiO_2$, from about 23.75% to about 25.25% by weight of CaO, from about 23.75% to about 25.25% by weight $Na_2O$ and from about 5.5% to about 6.5% by weight $P_2O_5$. The glass filler can be pre-dried and screened prior to dry-heat sterilization. Paste B comprises a silane-coated barium glass, such as, for example, a barium-boroaluminosilicate glass having from about 50% to about 55% by weight $SiO_2$, from about 30% to about 35% by weight of BaO, from about 8% to about 10% by weight of $Al_2O_3$, from about 7% to about 9% by weight of $B_2O_3$ with trace amounts of $Na_2O$, CaO, $Fe_2O_3$, and $P_2O_5$. The barium-coated glass is further combined with a silica in a blending step to form filler B.

In other embodiments that may be preferred, the filler level of pastes A and B can vary from about 65% to about 85% by weight of total filler content with the preferred bioactive glass-ceramic, such as the Combeite glass-ceramic ("CGC") filler and composition disclosed in U.S. Pat. No. 5,681,872, and assigned to Orthovita, Inc., the assignee of the present invention which is incorporated herein in its entirety by reference. The content of the preferred bioactive glass-ceramic preferably ranges from about 10% to about 99% by weight of that filler. It is preferred that the particle size distribution of the fillers be broad, bimodal, or trimodal. The particle size can be less than about 300 μm, or less than about 53 μm, with less than about 5% by weight being less than about 0.1 μm in size.

The invention also has other embodiments that are methods of stabilizing a polymerizable biocompatible material. The steps may include providing at least one monomer having an acrylate functional group, adding a stabilizing amount of an amino acid or reducing salt to said monomer to form a stabilizing mix, and adding a filler to said mix to form a stabilized paste. The method can also include steps of adding a stabilizing amount of an amino acid or reducing salt to the filler or paste, in addition to or instead of adding the stabilizing amount to the monomer. Embodiments of the present invention include methods of restoring tissue in an animal wherein one adds a stabilizer to at least one monomer, combines at least one monomer with at least one filler to form at least one homogeneous composition sterilely contained within a delivery vessel, and applies the composition to an animal whereby the tissue may be restored.

The invention can also have uses in non-medical systems to prevent oxidation of key components without inhibiting polymerization.

While the present invention has been particularly shown and described with reference to the presently preferred embodiments thereof, it is understood that the invention is not limited to the embodiments specifically disclosed herein. Numerous changes and modifications may be made to the preferred embodiment of the invention, and such changes and modifications may be made without departing from the spirit of the invention. It is therefore intended that the appended claims cover all such equivalent variations as they fall within the true spirit and scope of the invention.

EXAMPLE 1

A) Thirty-five grams of 19.1% L-cysteine solution was sprayed onto 500 g of silane treated filler while mixing in a mixer. The resultant material was placed in a vacuum oven set at 6 in Hg and 110° C. for 24 to 48 hours. The partially cake-like material was then broken apart with a spatula and sieved through a 300 μm screen. Material which did not pass through the 300 μm screen was ground with a mortar and pestle and then sieved through a 150 μm screen. Filler as prepared above was then blended with resin to form a stabilized paste.

B) The process described above in A) was repeated except the L-cysteine solution was sprayed onto untreated filler while mixing in a mixer. The filler was then mixed with resin to form a stabilized paste.

C) The process as described above in A) was repeated except the L-cysteine solution was sprayed onto untreated filler while mixing in a mixer. The L-cysteine coated filler was then coated with silane. The filler was then mixed with resin to form a stabilized paste.

EXAMPLE 2

An L-cysteine salt solution was prepared and sprayed onto two batches of untreated fillers. One batch was then silanated and mixed with resin to form a stabilized paste; the other batch was mixed directly (without silanation) with resin to form a stabilized paste.

EXAMPLE 3

1% and 0.5% of L-cysteine stabilizer was added to A resin. Control resin without the addition of stabilizer was also prepared. Set-time and temperature upon cure were measured at time, t=0, t=10 days, t=45 days, and t=70 days for both the stabilized materials and the control. Results indicate that the addition of the L-cysteine inhibited auto polymerization of the samples under 45° C. storage as compared to control samples—one of which polymerized after 20 days (FIG. 1). In addition, the L-cysteine containing samples did not inhibit polymerization upon mixing with a peroxide containing resin. In general, the set-time of the stabilized samples remained below 200 seconds for 50 days when stored at 45° C., which compares favorably to control samples that required refrigeration to achieve the same effect.

Figure 2:
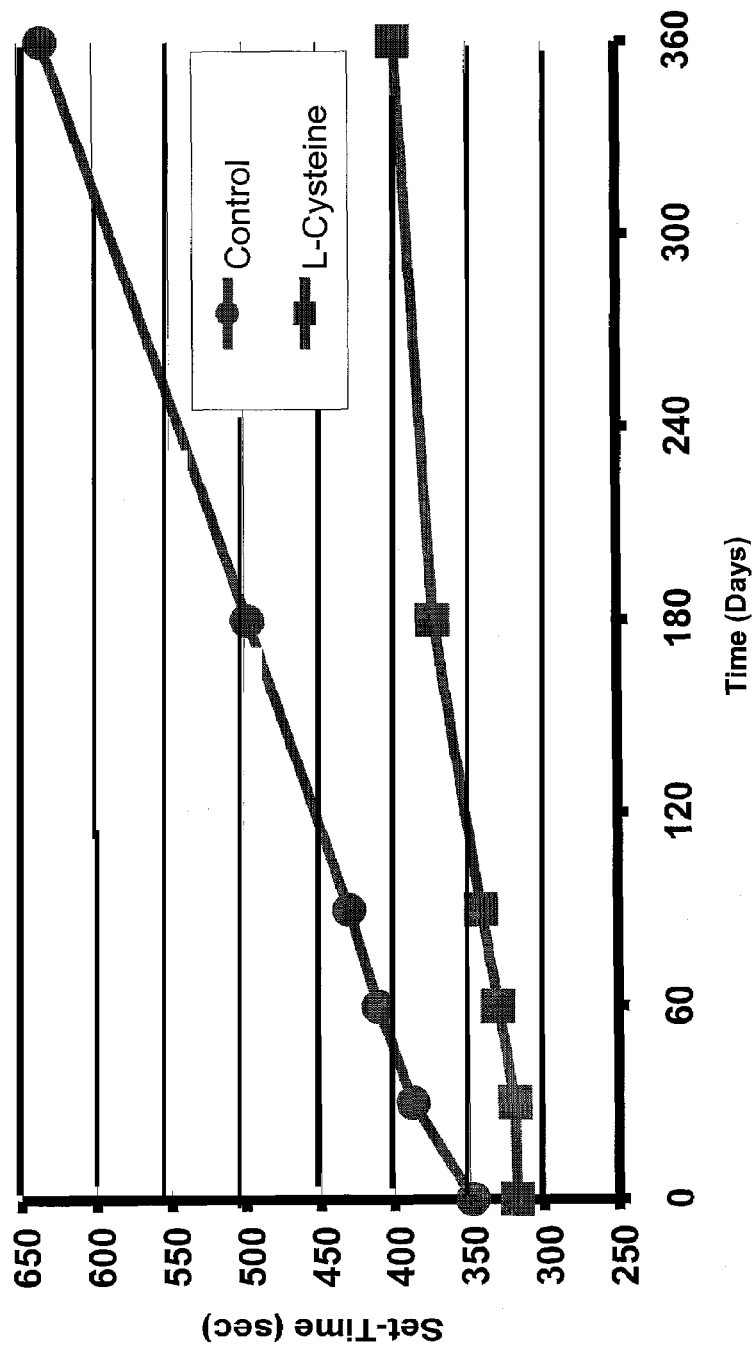
FIG. 2 provides a graphical representation of the effects of the addition of L-cysteine to an amine containing resin of a peroxide/amine initiated methacrylate paste system.

B) The utilization of stabilized accelerator containing resin in the preparation of composite paste also demonstrated maintenance of the set-time and reaction temperature. This indicated little change in the degree of polymerization. Overall, after 1 year of storage at 25° C. the stabilized paste exhibited an increase in set-time of 50% which compares favorably to control samples which exhibited a nearly 100% increase (FIG. 2).

What is claimed:

1. A sterile, free radical polymerizable biocompatible material for orthopedic applications comprising at least one monomer having an acrylate functional group, at least one filler, and a stabilizer, wherein the stabilizer is cysteine and is present in an amount of 0.3%-1% by weight of the polymerizable biocompatible material.

2. The polymerizable biocompatible material of claim 1 wherein the amino acid is L-cysteine.

3. The polymerizable biocompatible material of claim 1 wherein said monomer is bisphenol-A-diglycidyl methacrylate, triethyleneglycol dimethacrylate, diurethane dimethacrylate, bisphenol-A-ethoxy methacrylate, methylmethacrylate, or methacrylate.

4. The polymerizable biocompatible material of claim 1 wherein said filler is comprised of particles ranging from about 0.01 μm to 2-3 mm.

5. The polymerizable biocompatible material of claim 4 wherein said particles range from about 0.1 to 100 μm.

6. The polymerizable biocompatible material of claim 4 wherein said filler is bioactive.

7. The polymerizable biocompatible material of claim 1 further comprising a polymerization inhibitor, wherein said inhibitor is hydroquinone or a functional equivalent.

8. The polymerizable biocompatible material of claim 7 wherein said polymerization inhibitor, is butylatedhydroxytoluene, butylated hydroxyaniline, UV-9 (2hydroxy-4-methoxy benzophenone), methyl ether hydroquinone, 4-benzyloxy phenol, or 3,5-diisopropyl phenol.

9. The polymerizable biocompatible material of claim 8 wherein the polymerization inhibitor is butylatedhydroxytoluene.

10. The polymerizable biocompatible material of claim 1 wherein the material forms a liquid/powder or paste/paste system.

11. The polymerizable biocompatible material of claim 1 wherein the filler is barium glass, barium-boroaluminosilicate glass, sodium borosilicate, silica, 45S5 glass, bioactive glass ceramics, glass-ceramics, bioactive synthetic combeite glass-ceramic, e-glass, s-glass, iron phosphate, or combinations thereof.

12. A method of stabilizing a free radical polymerizable biocompatible material comprising:
   providing at least one monomer having an acrylate functional group, adding cysteine in an amount of 0.3%-1% by weight of the polymerizable biocompatible material to said monomer to form a pre-polymerization stabilizing mix, and
   adding a filler to said mix to form a stabilized paste.

13. The method of claim 12 wherein said monomer is bisphenol-A-diglycidyl methacrylate, triethyleneglycol dimethacrylate, diurethane dimethacrylate, bisphenol-A-ethoxy methacrylate, methylmethacrylate, or methacrylate.

14. The method of claim 12 wherein said filler is comprised of particles ranging from about 0.01 μm to 2-3 mm.

15. The method of claim 12 wherein said particles range from about 0.1 to 100 μm.

16. The method of claim 12 wherein said filler is bioactive.

17. The method of claim 12 further comprising at least one polymerization inhibitor.

18. The method of claim 12, wherein said polymerization inhibitor is hydroquinone or various functional equivalents.

19. The method of claim 18 wherein said functional equivalents are butylatedhydroxytoluene, butylated hydroxyaniline, UV-9 (2-hydroxy-4-methoxy benzophenone), methyl ether hydroquinone, 4-benzyloxy phenol, or 3,5-diisopropyl phenol.

20. The method of claim 17 wherein the polymerization inhibitor is butylatedhydroxytoluene.

21. The method of claim 12 wherein the filler is barium glass, barium-boroaluminosilicate glass, sodium borosilicate, silica, 45S5 glass, bioactive glass ceramics, glass-ceramics, bioactive synthetic combeite glass-ceramic, e-glass, s-glass, iron phosphate, or combinations thereof.

* * * * *